US009967181B2

(12) United States Patent
Zhu et al.

(10) Patent No.: US 9,967,181 B2
(45) Date of Patent: May 8, 2018

(54) PACKET LABELING IN A VIRTUAL NETWORK

(71) Applicant: Futurewei Technologies, Inc., Plano, TX (US)

(72) Inventors: Jiafeng Zhu, San Ramon, CA (US); Changcheng Huang, Ottawa (CA); Min Luo, San Jose, CA (US); Wu Chou, Basking Ridge, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 189 days.

(21) Appl. No.: 14/596,013

(22) Filed: Jan. 13, 2015

(65) Prior Publication Data

US 2015/0200844 A1 Jul. 16, 2015

Related U.S. Application Data

(60) Provisional application No. 61/926,886, filed on Jan. 13, 2014.

(51) Int. Cl.
*H04L 12/28* (2006.01)
*H04L 12/723* (2013.01)
*H04L 12/741* (2013.01)

(52) U.S. Cl.
CPC ............ *H04L 45/507* (2013.01); *H04L 45/74* (2013.01)

(58) Field of Classification Search
None
See application file for complete search history.

(56) References Cited

U.S. PATENT DOCUMENTS

| 2002/0126681 | A1* | 9/2002 | Kazban | H04L 12/4604 370/409 |
| 2008/0250492 | A1 | 10/2008 | Hazard | |
| 2009/0028166 | A1* | 1/2009 | Pushparaj | H04L 45/308 370/401 |
| 2011/0145891 | A1* | 6/2011 | Bade | H04L 63/101 726/4 |
| 2012/0063450 | A1* | 3/2012 | Pignataro | H04L 45/68 370/389 |
| 2013/0054761 | A1 | 2/2013 | Kempf et al. | |
| 2013/0163594 | A1* | 6/2013 | Sharma | H04L 45/64 370/392 |

(Continued)

OTHER PUBLICATIONS

International Search Report, dated May 6, 2015, PCT/US2015/011155.
Vaez-Ghaemi., "Next-generation Packet-Based Transport Networks (PTN)" White Paper 2010. Retrieved on [Aug. 3, 2015], Retrieved from the internet: <URL: http://www.jdsu.com/ProductLiterature/next-generation-ptn-white-paper.pdf>.

*Primary Examiner* — Kwang B Yao
*Assistant Examiner* — Juvena Loo
(74) *Attorney, Agent, or Firm* — Vierra Magen Marcus LLP (57) ABSTRACT

A client is provided with information that defines a virtual network for the client, where the virtual network is implemented on a physical network. A label is assigned to the virtual network. The label is sent to packet-handling devices in the physical network that are part of the virtual network. The label is also sent to a controller of the virtual network. The first label is then included in data packets sent over the virtual network. The packet-handling devices handle the data packets on the virtual network according to a policy associated with the label.

20 Claims, 8 Drawing Sheets

(56) References Cited

U.S. PATENT DOCUMENTS

| | | | | |
|---|---|---|---|---|
| 2013/0212241 A1* | 8/2013 | Kang | H04L 45/64 | 709/223 |
| 2013/0272305 A1* | 10/2013 | Lefebvre | H04L 47/24 | 370/392 |
| 2013/0332602 A1 | 12/2013 | Nakil et al. | | |
| 2014/0161002 A1* | 6/2014 | Gauvreau | H04W 16/24 | 370/280 |
| 2014/0233385 A1* | 8/2014 | Beliveau | H04L 47/122 | 370/235 |
| 2014/0313928 A1* | 10/2014 | Fernando | H04L 49/70 | 370/254 |
| 2014/0334295 A1* | 11/2014 | Guichard | H04L 47/2441 | 370/230 |
| 2014/0362857 A1* | 12/2014 | Guichard | H04L 45/566 | 370/392 |
| 2015/0026362 A1* | 1/2015 | Guichard | H04L 45/30 | 709/242 |
| 2015/0063102 A1* | 3/2015 | Mestery | H04L 41/12 | 370/230 |
| 2015/0071285 A1* | 3/2015 | Kumar | H04L 45/306 | 370/392 |
| 2015/0092551 A1* | 4/2015 | Moisand | H04L 12/4633 | 370/235 |
| 2015/0103827 A1* | 4/2015 | Quinn | H04L 45/74 | 370/392 |
| 2016/0308981 A1* | 10/2016 | Cortes Gomez | H04L 67/16 | |

\* cited by examiner

PACKET LABELING IN A VIRTUAL NETWORK

RELATED U.S. APPLICATION

This application claims priority to U.S. Provisional Application No. 61/926,886, entitled "Protocol Mechanism for Supporting Virtual Networks and Traffic Steering," filed on Jan. 13, 2014, hereby incorporated by reference in its entirety.

BACKGROUND

Software-defined networking (SDN) is a form of computer networking in which the control plane is decoupled from the data plane. With a separated control plane, SDN can be used to enable different types of services. One of those services is network virtualization, which allows a physical network provider to sell or lease different virtual networks to different clients (e.g., service network providers). Each service network provider can use its virtual network just like it uses its own private network while sharing underlying physical network resources with other service network providers.

Service chaining is another service in which SDN can play an important role. Traditionally, a service chain consists of a set of dedicated network service boxes such as firewalls, load balancers, and application delivery controllers that are concatenated to support a specific application. With a new service request, new devices must be installed and interconnected in a certain order. This can be a complex, time-consuming, and error-prone process, requiring careful planning of topology changes and network outages and increasing costs. These problems can be exacerbated when a client requires different service sequences for different traffic flows or when multiple clients share the same network.

Network Function Virtualization (NFV) is a concept built on network virtualization. It involves the implementation of network functions in software that can run on a range of industry-standard high-volume servers, switches, and storage devices. With NFV, SDN can dynamically create a virtual environment for a specific service chain and eliminate the additional hardware and other issues described above.

Another service in which SDN can play an important role is application-centric traffic steering. Application service providers have tried various ways to differentiate their customers so that they can maximize their revenues and minimize their costs. For example, cookies have been used to track HTTP (HyperText Transfer Protocol) users; however, because cookies sit within the application layer (Layer 7 of International Organization for Standardization Open Systems Interconnection (ISO/OSI) model), they provide very little information that is helpful for the provisioning of network and computing resources. On the other hand, differentiated services (e.g., "DiffServ") architectures and virtual local area networks (VLANs) sit below ISO/OSI Layer 4. Consequently, information that might be used to differentiate customers is not maintained from one end of the network to another. Therefore, application-centric traffic steering, although widely desired, is still hard to achieve. SDN is being advanced as a possible solution to the problems associated with achieving application-centric traffic steering.

SUMMARY

In embodiments according to the invention, a new data packet label is introduced. The label can be included in the headers of data packets. In an embodiment, the label is at Layer 5 (the session layer) of the ISO/OSI model; at that layer, the label can be maintained across a virtual network. The label can be used, for example, to identify a service instance (e.g., network virtualization, service chaining in a virtual network, and application-specific steering in a virtual network) for packet forwarding. The label may be referred to herein as a Service Forwarding Label (SFL).

In an embodiment, a client enterprise is provided with information that defines a virtual network for the client, where the virtual network is implemented at one of the levels of a virtual network architecture (e.g., an SDN) that is implemented on a physical network. A controller assigns a label (e.g., an SFL) to the virtual network. In an embodiment, the label is unique to the virtual network relative to other labels assigned by the controller to other virtual networks that are at the same level of the virtual network architecture. The label is sent to packet-handling devices in the physical network that are part of the virtual network. The label is also sent to a controller of the virtual network. The label is then included in data packets sent over the virtual network. The packet-handling devices handle (e.g., route or process) the data packets on the virtual network according to a policy associated with the label.

Labels can be stacked. For example, a network provider can create a first virtual network for a first client (e.g., at a first level of the virtual network architecture), and the first client in turn can lease a portion of their virtual network to create a second virtual network for a second client (e.g., at a second level of the virtual network architecture); this is referred to herein as a recursive service. The network provider assigns a first label (a first-level label) to the first-level virtual network and sends it to a controller of the first-level virtual network, and the first client assigns a second label (a second-level label) to the second-level virtual network and sends it to a controller of the second-level virtual network. The first-level label is included in data packets that belong to the first-level virtual network, and the first-level label and the second-level label are included in data packets that belong to the second-level virtual network. The packet-handling devices handle the data packets that belong to the first-level virtual network according to a policy associated with the first-level label, and handle the data packets that belong to the second-level virtual network according to a policy associated with the combination of the first-level and second-level labels.

In an embodiment, a lifetime is associated with each label. When the lifetime expires, the label can be renewed or terminated if not renewed.

Embodiments according to the present invention provide an effective virtual network identifier (a label; e.g., an SFL) that helps realize the potential of SDN in network virtualization, facilitating the process that allows a network provider to sell or lease virtual slices of its physical network to different clients (network service providers) that in turn may sell or lease virtual slices of their virtual networks to yet other clients. An SFL can be used as an identifier for a service instance such as, but not limited to, network virtualization, service chaining, and application-specific steering. The SFL is controlled by service providers and used by clients and packet-handling devices to route traffic by service instance. The format of an SFL is simple enough that it can be used without negatively impacting overhead and may reduce overhead relative to other solutions. By stacking SFLs, recursive services such as recursive network virtualization can be supported while allowing different entities to exercise control over their own resources. Furthermore, SFLs can be implemented with existing protocols and technologies. At Layer 5, an SFL can traverse middle-boxes and legacy networks without being changed, so that the relationship between clients and service providers can be maintained end-to-end. Also, SFLs can effectively enable various new services. For instance, services such as service chaining and application-centric traffic steering can be realized with reduced overhead.

The physical devices (e.g., routers or switches) that implement a virtual network (e.g., an SDN) can use the label (e.g., an SFL) and associated information (e.g., an application's metadata, routing policies, security policies, and Layer 4-7 services) to make packet-level routing and forwarding decisions.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "providing," "assigning," "sending," "defining," "handling," "processing", "routing," "receiving," "generating," "including," "associating," "adding," or the like, refer to actions and processes (e.g., flowchart 700 of FIG. 7) of a computer system or similar electronic computing device or processor (e.g., the controller 810 of FIG. 8). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
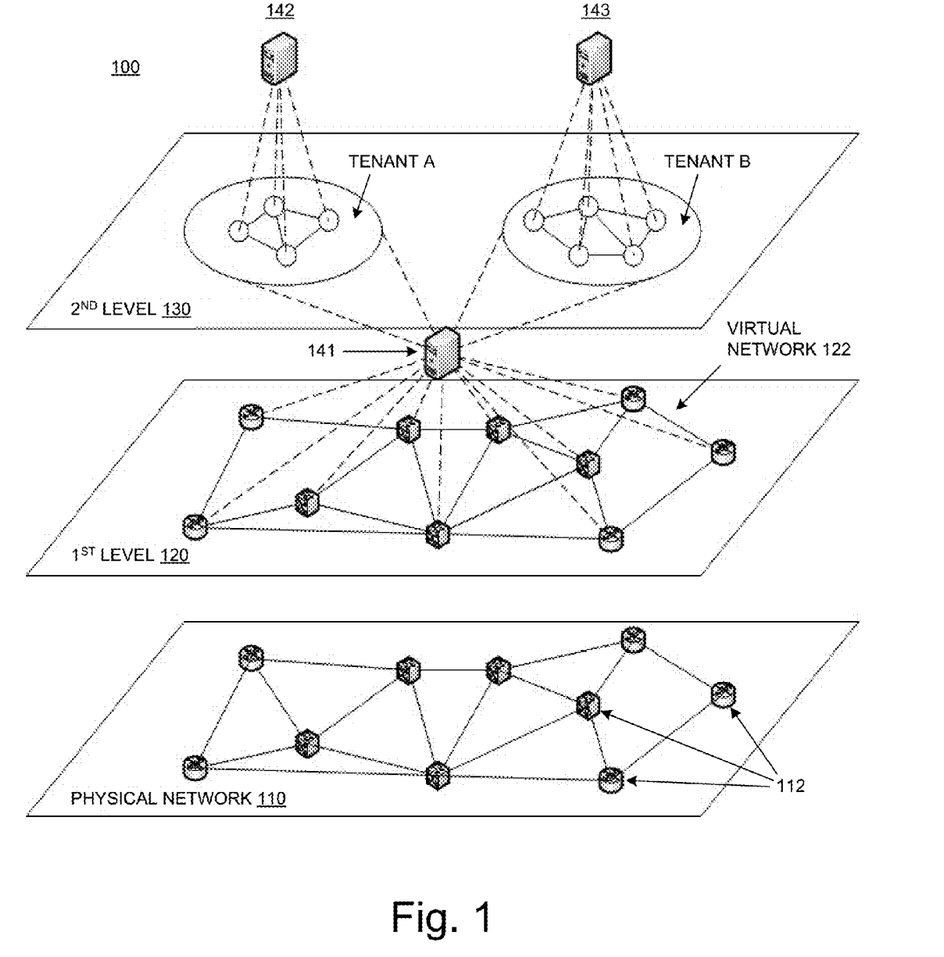
FIG. 1 illustrates an example of a software-defined network (SDN) architecture that can be used for virtual network services in embodiments according to the invention.

FIG. 1 illustrates an example of a software-defined network (SDN) architecture 100 that can be used for virtual network services in embodiments according to the invention. In the example of FIG. 1, the architecture 100 includes a physical network 110, a first level 120 of virtual networks, and a second level 130 of virtual networks. (Note that terms such as "first level" and "second level" may be used at times herein to distinguish different levels within the virtual network architecture, but the term "first level" does not necessarily refer to the first or lowest level of the architecture, the term "second level" does not necessarily refer to the second level of the architecture, and so on. At times, the term "first level" does refer to the lowest level; those times will be clear by the context in which that term is used.) There can be any number of levels of virtual networks (although the number may be limited by, for example, the capacity of the physical network 110).

The physical network 110 includes a number of physical devices 112 referred to generally herein as packet-handling devices. The packet-handling devices 112 include the types of devices found in a physical network such as, but not limited to, application servers, storage servers, routers, switches, load balancers, firewalls, and network address translators (NATs). Sometimes, devices such as firewalls and NATs, for example, are referred to as middle-boxes.

The first level 120 of virtual networks is overlaid on the physical network 110. For example, the enterprise that is the provider of the physical network 110 can generate a virtual topology that defines a virtual network 122 in the first level 120. There can be any number of virtual networks at the first level 120 (although the number may be limited by the capacity of the physical network 110).

Protocols for enabling virtual network architectures such as the SDN architecture 100 are known in the art. One such protocol is OpenFlow, managed by the Open Networking Foundation (ONF); however, embodiments according to the invention are not limited to OpenFlow.

With OpenFlow, for example, OpenFlow Controllers (OFCs) 141, 142, and 143 configure network devices (e.g., the packet-handling devices 112), route traffic (data packet) flows, and manage resource usage within their own virtual network topology. The controllers 141-143 can be implemented in software that executes on a system or device that includes a processing circuit (processor) and memory (see FIG. 8, for example). Communications between applications and devices go through the controller. Each controller executes a topology abstraction process through a topology virtualizer based on a global topology map of the underlying physical network 110.

The provider of the physical network 110 of FIG. 1 can sell or lease the physical network, or portions of the physical network, to various service providers (client enterprises). Each portion has its own virtual network topology and related resources that are generated through the topology abstraction process. Resources (e.g., the packet-handling devices 112) in the physical network 110 can be shared between different virtual networks. Each of the service providers can then manage usage of the portion that they own/lease. Accordingly, service providers can sell or lease their virtual networks, or portions of their virtual networks, to other service providers (other clients). Thus, a service provider may be a client in one role (e.g., as the client of the physical network provider or of another virtual network provider) and a service provider in another role (e.g., as a network provider or a virtual network provider).

For example, a first-level virtual network provider (e.g., the provider of virtual network 122) can sell or lease virtual networks to multiple second-level virtual network providers (e.g., tenants A and B), which in turn may sell or lease virtual networks to their customers (not shown). This process can continue through multiple levels, making service providers into network providers in a recursive manner. These kind of recursive services can be used, for example, by an enterprise that provides virtual server services to a content (e.g., video) provider, which in turn provides video streaming services to its subscribers.

Embodiments according to the invention introduce a label, which is referred to herein as a Service Forwarding Label (SFL), that can be used to differentiate services and forward data packets in an SDN architecture such as that shown in FIG. 1. SFLs are created and maintained by a service provider (via a controller) and used in the physical network to identify and steer traffic belonging to different service instances (a service instance includes, for example, network virtualization, service chaining in a virtual network, and application-specific steering in a virtual network). SFLs can be stacked for applications such as a recursive service as described above.

In an embodiment, each SFL is unique within the space of the controller that administers the SFL. In the FIG. 1 example, a service provider has two tenants: tenant A and tenant B. The SFL assigned to tenant A is unique to that tenant and is different from the SFL assigned to tenant B. Thus, data packets belonging to different virtual networks at the same level in the SDN architecture 100 can be differentiated by their respective SFLs; data packets that belong to the tenant A's virtual network can be differentiated from data packets that belong to tenant B's virtual network, and vice versa, for example. The combination of the SFLs in a stack of SFLs uniquely identifies which of the virtual networks the data packets belong to at any layer in the SDN architecture. For example, a customer of tenant A can be uniquely identified by the combination of the SFL assigned to tenant A and the SFL assigned to the virtual network 122.

Each SFL is associated with a lifetime. When the lifetime for an SFL expires, the SFL can be terminated or be renewed. This dynamic mechanism allows a service provider to maintain a smaller pool of SFLs, meaning that fewer bits can be used to define a unique SFL, thus reducing the impact of SFLs on overhead and perhaps reducing total overhead relative to other solutions.

In an embodiment, the SFLs are inserted into the header (or preamble) of each data packet at Layer 5 of the ISO/OSI model. This corresponds to the session layer, which is usually used to establish, manage, and terminate connections between local and remote applications. By inserting an SFL into a data packet header at Layer 5, the SFL will remain intact while the data packet traverses legacy IP (Internet Protocol) networks and middle-boxes. A port in UDP (User Datagram Protocol) and another port number in TCP (Transmission Control Protocol) can be assigned to identify the existence of SFLs in Layer 5. The top-level SFL of an SFL stack can use all existing port number assignments to identify various applications.

Figure 2A:
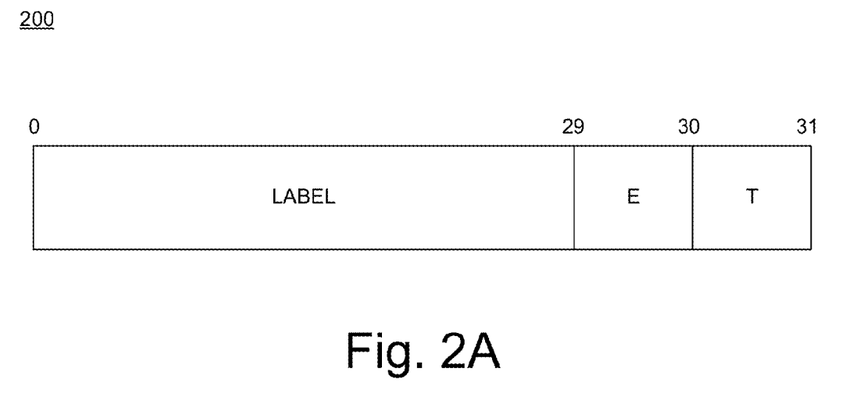
FIGS. 2A and 2B illustrate an example of a format for a Service Forwarding Label (SFL) in an embodiment according to the present invention.
Figure 2B:
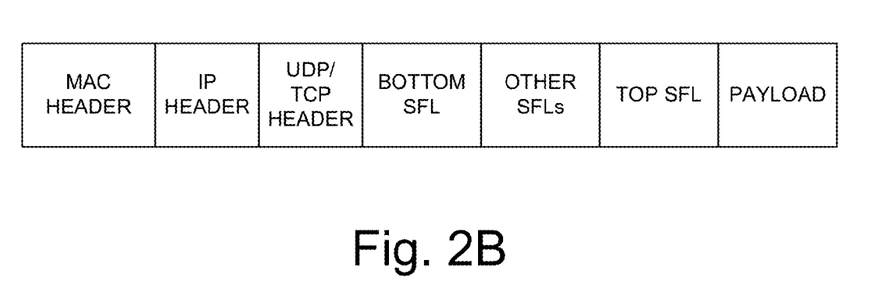

FIGS. 2A and 2B illustrate an example of a format for an SFL in an embodiment according to the invention. In the example of FIG. 2A, an SFL 200 is represented by four octets. Starting from bit 0 of the octets, the first 30 bits (bits 0-29) hold the label, bit 30 (E) is reserved for experimental use, and bit 31 (T) is the bottom-of-stack bit (T-bit). In an embodiment, the T-bit is set to one for the last entry in a stack of SFLs or if there is only a single SFL in the header, and to zero for other SFLs in the stack.

With the SFL inserted at Layer 5, the SFL can be used with either UDP or TCP, making the SFL applicable to traffic belonging to the same service instance. For example, in a service chain instance, data packets may need to traverse multiple middle-boxes before reaching their destination. Packet-handling devices such as firewalls and load balancers provide functions that may require processing packets up to the transport layer (Layer 4 of the OSI/ISO model). Therefore, header information including all layers up to the transport layer (Layers 1-3) will not be maintained across a network. This will make it difficult for physical devices such as switches to steer the data packets to the correct next middle-box on the path to their destination. By implementing the SFL at Layer 5, this issue is resolved.

An example format for a packet header that includes SFLs is shown in FIG. 2B. In the example of FIG. 2B, multiple SFLs are shown; the SFLs are stacked. "Bottom SFL" refers to the SFL at the lowest level in the SDN architecture (e.g., the first level 120), and "Top SFL" refers to the uppermost level. As mentioned above, the value of the T-bit is set to zero, for example, in the first (bottom) SFL to indicate that there is a second SFL in the header, and set to zero in the second SFL to indicate that there is a third SFL, and so on until the final (top) SFL in the header is reached; the T-bit in the final SFL is set to one.

In the FIG. 2B example, the packet header can include other information such as a MAC (media access control) header, an IP header, and a UDP/TCP header. The packet header is followed by the packet payload. The packet header and payload constitute a data packet.

Figure 3A:
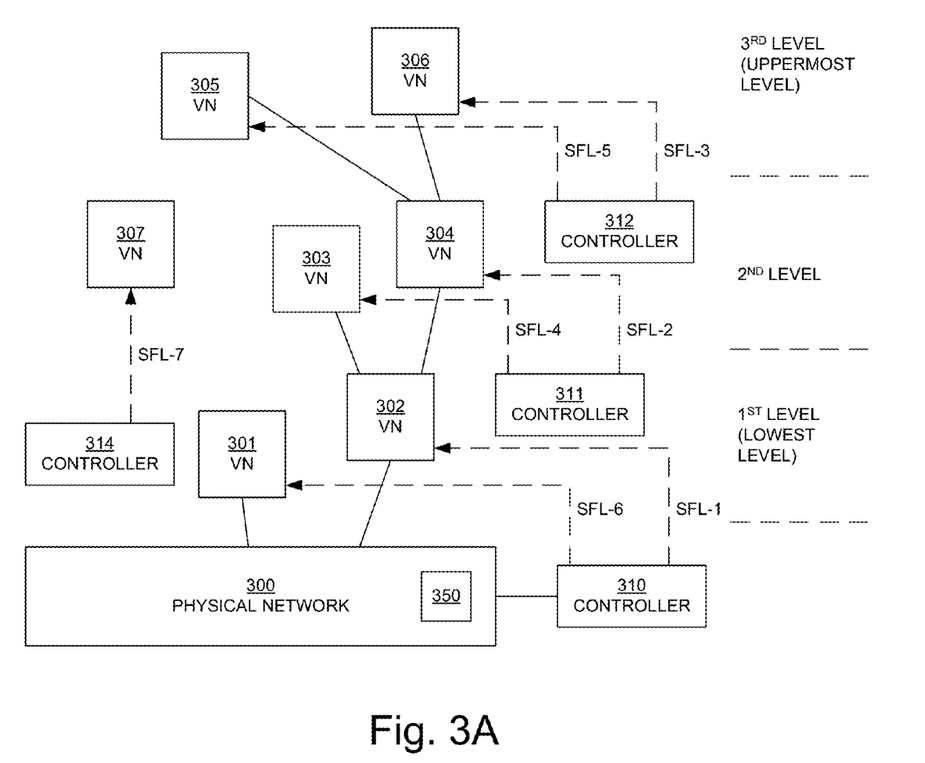
FIG. 3A illustrates a mapping between SFLs and virtual networks in an embodiment according to the present invention.
Figure 3B:
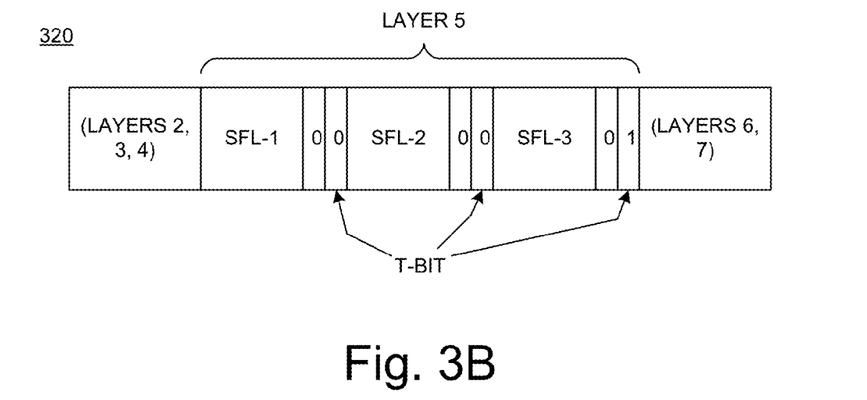
FIGS. 3B and 3C illustrate examples of data packet headers in an embodiment according to the present invention.
Figure 3C:
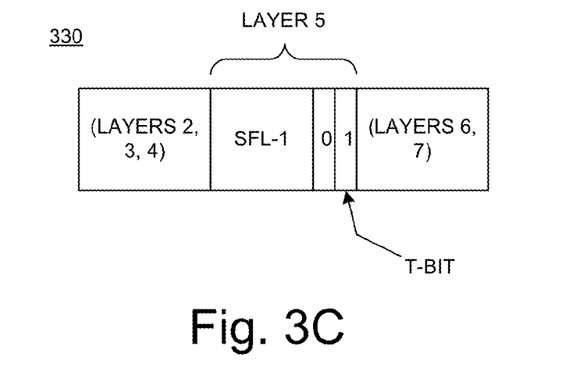
Figure 3D:
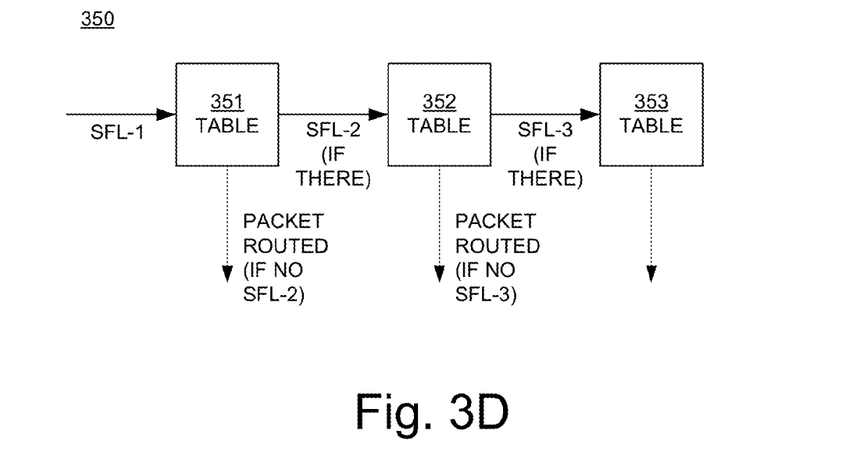
FIG. 3D illustrates the use of SFLs and routing tables to route data packets in an embodiment according to the present invention.

FIG. 3A illustrates a mapping between SFLs and virtual networks. FIGS. 3B and 3C illustrate examples of packet headers based on the example of FIG. 3A. FIG. 3D illustrates the use of SFLs and routing tables (e.g., flow tables) to route traffic based on the example of FIG. 3A. The examples of FIGS. 3A-3D are presented in the context of an SDN; however, the present invention is not so limited and the discussion can be extended to other types of virtual network architectures.

In FIG. 3A, virtual networks (VNs) 301 and 302 are in the first level of the SDN architecture. The first level may also be referred to as the lowest level. A controller 310 for the physical network 300 (e.g., an OFC, although the present invention is not so limited) assigns SFL-1 to the first-level virtual network 302. The first-level SFL-1 is unique to the virtual network 302; that controller will not assign SFL-1 to another virtual network at the first level of the SDN architecture. In other words, SFL-1 is unique within the space administered by the controller 310. An SFL-6, which is different from SFL-1, is also assigned by the controller 310 to the first-level virtual network 301.

In the example of FIG. 3A, the provider of the first-level virtual network 302, in turn, sells or leases a portion of the virtual network 302 to other clients/providers, creating virtual networks 303 and 304 in the second level of the SDN architecture. A controller 311 for the first-level virtual network 302 (e.g., another OFC) assigns SFL-2 to the second-level virtual network 304. The second-level SFL-2 is unique within the space administered by the controller 311. An SFL-4, which is different from SFL-2, is also assigned by the controller 311 to the second-level virtual network 303.

In the example of FIG. 3A, the provider of the virtual network 304, in turn, sells or leases a portion of the second-level virtual network 304 to other clients/providers, creating virtual networks 305 and 306 in the third level of the SDN architecture. In the FIG. 3A example, the third level is the highest or uppermost level. A controller 312 for the second-level virtual network 304 (e.g., yet another OFC) assigns SFL-3 to the third-level virtual network 306. The third-level SFL-3 is unique within the space administered by the controller 312. An SFL-5, which is different from SFL-3, is also assigned by the controller 312 to the third-level virtual network 305.

FIG. 3B shows an example of a packet header 320 for a data packet that belongs to the third-level virtual network 306. The packet header 320 is at Layer 5 and includes the first-level SFL-1, second-level SFL-2, and third-level SFL-3. The T-bit associated with the first-level SFL-1 is set to zero to indicate that there is a subsequent SFL (the second-level SFL-2) in the header, and the T-bit associated with SFL-2 is also set to zero to indicate there is a subsequent SFL (the third-level SFL-3) in the header. The T-bit associated with SFL-3 is set to one, thus indicating that the third-level SFL-3 is the last SFL in the header (in this example).

FIG. 3C shows an example of a packet header 330 for a data packet that belongs to the first-level virtual network 302. The packet header 330 is at Layer 5 and includes only the first-level SFL-1. Thus, the T-bit associated with SFL-1 is set to one.

FIG. 3D illustrates the use of routing (flow) tables that can be implemented on packet-handling devices in the physical network 300 in an embodiment according to the present invention, using the packet header 320 of FIG. 3B as an example. Each time an SFL is assigned to a virtual network, it is also added to the flow tables that are stored on the packet-handling devices and mapped to a policy that indicates how data packets that include that SFL are to be handled. Essentially, the flow tables contain a list of policies indexed by SFL. In the example of FIG. 3D, the packet-handling device 350 receives a data packet and reads the first-level SFL-1 from the packet header. If the value of the T-bit indicates that there are no other SFLs in the header, then the packet-handling device 350 compares SFL-1 to the SFLs that are stored in the flow table 351. In other words, a table lookup is performed using the first-level SFL-1 as the index. When a match is found, the packet-handling device 350 then routes or processes the data packet according to a first policy that is associated with the first-level SFL-1. If, on the other hand, the value of the T-bit indicates that there is another SFL (the second-level SFL-2) in the packet header, then the packet-handling device 350 compares the second-level SFL-2 to the SFLs that are stored in the flow table 352. When a match is found, the packet-handling device 350 then routes or processes the data packet according to a second policy associated with the second-level SFL-2; note the second policy is identified based on the combination of the first-level and second-level SFLs. If, however, the value of the T-bit indicates that there is another SFL (the third-level SFL-3) in the packet header, then the packet-handling device compares the third-level SFL-3 to the SFLs that are stored in the flow table 353. When a match is found, the packet-handling device 350 then routes or processes the data packet according to a third policy associated with the third-level SFL-3; note the third policy is identified based on the combination of the first-level, second-level, and third-level SFLs.

In an embodiment, an SFL has a standardized length; that is, all SFLs have the same length. This can facilitate table lookups such as those just described.

Because SFL-1 through SFL-7 are each unique within the spaces administered by their respective controllers 310, 311, 312, and 314, the data packets associated with one virtual network are differentiated from and handled differently than the data packets associated with any other virtual network. A single SFL can differentiate data packets according to the virtual network they belong to at the lowest level of the SDN architecture. For example, data packets that belong to the first-level virtual network 302 can be differentiated from the data packets that belong to the first-level virtual network 301 using a single SFL (the first-level SFL-1 versus the first-level SFL-6). The unique combination of SFLs can be used to differentiate data packets according to the virtual network they belong to at higher levels of the SDN architecture. For example, the data packets that belong to the second-level virtual network 304 are uniquely identified by the combination of the first-level SFL-1 and the second-level SFL-2 and so can be differentiated from and handled differently than the data packets that belong to the second-level virtual network 303 (which are identified by the combination of the first-level SFL-1 and the second-level SFL-4).

Also, for example, the first-level virtual network 301 may create a virtual network 307 at the second level of the SDN architecture, and the second-level SFL-7 may be assigned to the second-level virtual network 307 by the controller 314 for the first-level virtual network 301. Thus, the data packets that belong to the second-level virtual network 307 would be identified by a combination of the first-level SFL-6 and the second-level SFL-7. Because different controllers (the controller 311 and the controller 314) are assigning SFLs at the same level, there is a possibility that the controllers might both assign the same sequence of bit values to the second-level SFL-2 and the second-level SFL-7, for example. However, even if the second-level SFL-7 is identical to the second-level SFL-2, data packets that belong to the second-level virtual network 304 can be differentiated from data packets that belong to the second-level virtual network 307 because the combination of the first-level SFL-1 and the second-level SFL-2 (the combination of SFLs uniquely associated with the second-level virtual network 304) would be different from the combination of the first-level SFL-6 and the second-level SFL-7 (the combination of SFLs uniquely associated with the second-level virtual network 307), because the first-level SFL-6 is different from the first-level SFL-1. Thus, it is not necessary for the controllers 311 and 314, for example, to consult each other before they assign SFLs.

The physical devices (e.g., routers or switches) that implement a virtual network (e.g., an SDN) can use the label (e.g., an SFL) and associated information (e.g., an application's metadata, routing policies, security policies, and Layer 4-7 services) to make packet-level routing and forwarding decisions.

Figure 4:
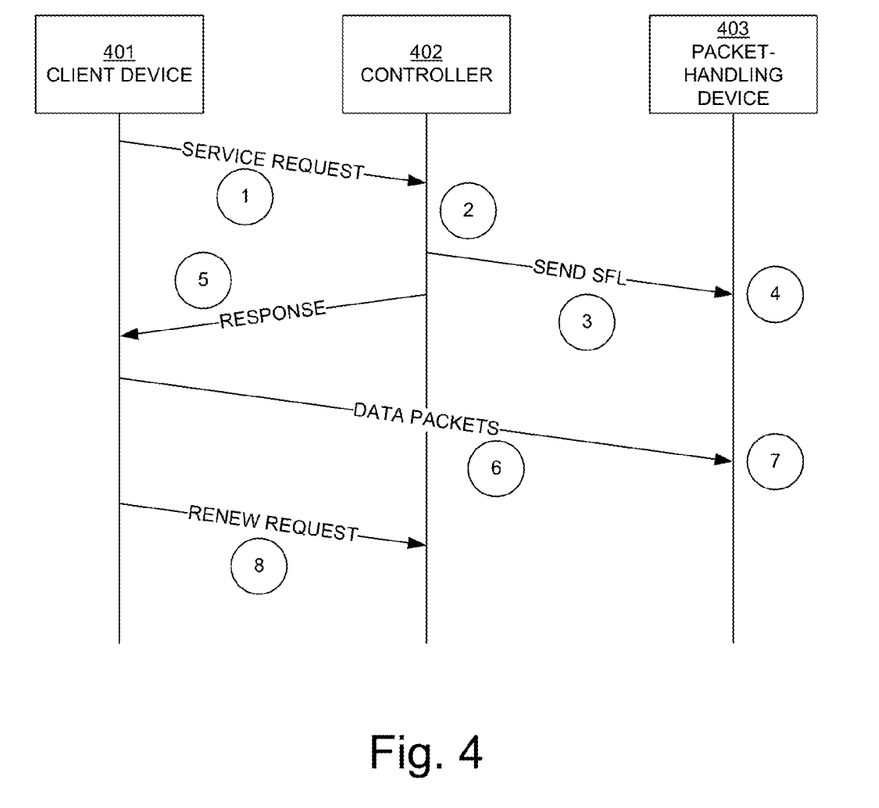
FIG. 4 illustrates a process for assigning and using SFLs in an embodiment according to the present invention.

FIG. 4 illustrates a process for assigning and using SFLs in an embodiment according to the present invention. At operation 1, a client device 401 sends a service request to the controller 402 (e.g., an OFC) for a service provider. The request can include information such as an identifier (ID) for the client and other parameters that are used by the controller to define a virtual network. In an embodiment, the request is sent using an HTTP Post message. As mentioned above, the service provider may be the provider of a physical network that is selling/leasing a virtual network, or the service provider may be an enterprise that has a virtual network on the physical network at one level of the SDN architecture 100 of FIG. 1 (e.g., at the first level 120) and is selling/leasing a virtual network at the next level of the SDN architecture (at the second level 130). Similarly, the client may be another service provider that may in turn sell or lease a virtual network to yet another client/provider.

At operation 2 of FIG. 4, the controller 402 for the service provider decides whether it can accept the request. If so, then the controller 402 determines how to allocate and configure resources and generate a topology for a virtual network that satisfies the client's request, and the following operations can then be performed.

At operation 3, the controller 402 creates an SFL that is unique to the space administered by the controller, and sends a message that includes the SFL to the packet-handling devices that are included in the topology of the virtual network (the device 403, e.g., a switch or middle-box). In an embodiment, the message also includes a lifetime for the SFL. In an Open Flow embodiment, the SFL is sent using an OpenFlow OFPT_FLOW_MOD message.

At operation 4, upon receiving the SFL from the controller 402, each packet-handling device 403 adds the SFL (and its lifetime) into its respective flow table(s).

At operation 5, the controller 402 sends a message (e.g., an HTTP response message) that includes the SFL (and its lifetime) to the client device 401 to confirm acceptance of the client's request.

At operation 6, the SFL is included in the headers of data packets that belong to the virtual network. The SFL can be added when the data packets are created. For example, when a user logs into and uses the virtual network, the SFL can be inserted into data packet headers by the user's device when they are transmitted to the virtual network. Alternatively, the SFL can be inserted in data packet headers as the data packets are received into the virtual network, e.g., at an access point that is upstream of the packet-handling devices.

At operation 7, when the data packets reach a packet-handling device 403 (e.g., a switch or middle-box) that is included within the topology of the virtual network, the packet-handling device will match the SFL (and any other SFLs in the data packets' headers) with the corresponding entry in its flow table, and then will determine how to forward or process the packets based on the policy associated with that entry. The packet-handling device then processes or routes the data packets according to that policy.

At operation 8, when the lifetime of the SFL expires, the client can choose to either renew the SFL or allow it to expire. If the client decides to renew, it will send a message (e.g., an HTTP request message) with the SFL to the controller 402.

The introduction of SFLs as disclosed herein allows network providers to exercise control of their virtual networks independently of other network providers. Each network provider can decide how to assign, for example, virtual local area network (VLAN) IDs and IP addresses within their own virtual networks without consulting each other. The use of SFLs eliminates the possibility of overlapping address spaces in the physical network if, for example, private IP address blocks are used. If the two virtual networks used by Tenant A and Tenant B use the same address space, packet-handling devices (e.g., switches) in the physical network can use the SFLs to differentiate data packets for the two virtual networks.

Figure 5:
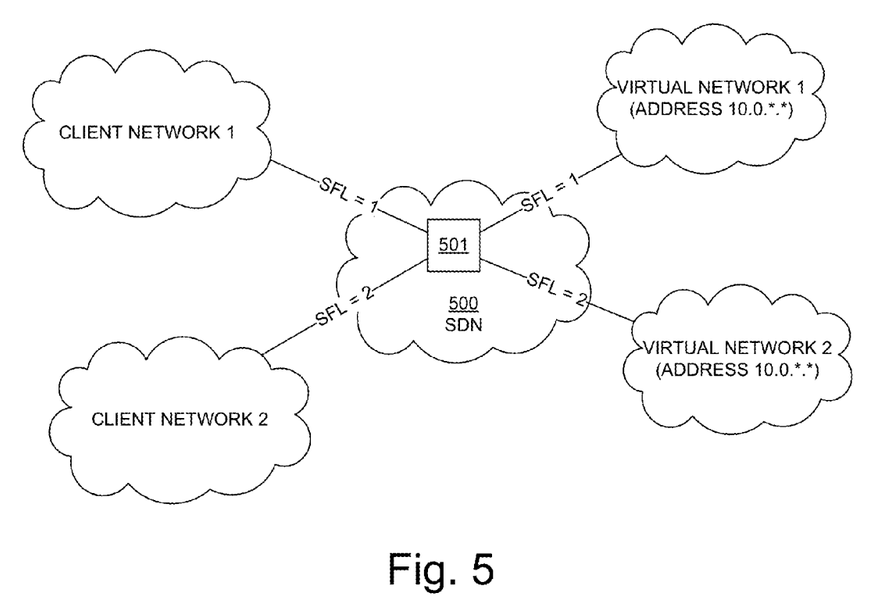
FIG. 5 illustrates an example of a network virtualization service in an embodiment according to the present invention.

FIG. 5 illustrates an example of a network virtualization service in an embodiment according to the present invention, in which parallel virtual networks use overlapping address spaces (e.g., 10.0.*.*). In the FIG. 5 example, client network 1 owns virtual network 1 and client network 2 owns virtual network 2. Both virtual network 1 and virtual network 2 share resources in an SDN network 500 (a physical network owned by an SDN network provider; see FIG. 1). Each service network provider (the provider of client network 1 and the provider of client network 2) can have full control over their virtual network. When a data packet reaches the packet-handling device 501 (e.g., a switch) in the SDN network 500, the packet-handling device will determine which virtual network the packet belongs to.

As described in connection with FIG. 4, each client (virtual) network receives an SFL that serves as a unique identifier for the virtual network and is included in the header of data packets that are being used in the virtual network. When data packets reach the packet-handling device 501, the packets can be differentiated using the SFL (or stack of SFLs) included in their headers even though their IP address spaces may overlap. This can be done by matching each SFL to an entry in a flow table 520 that is stored on the packet-handling device 501, as previously described herein (see FIG. 3D). In the example of FIG. 5, if the SFL has a value of 1, then the packet is routed to virtual network 1, and if the SFL has a value of 2, then the packet is routed to virtual network 2 (as described above, an actual SFL may include multiple bits, e.g., it may be a 30-bit value). Without the introduction of SFLs, multiple header fields may need to be matched in order to identify which virtual network the data packets belong to, which can increase the size of the flow tables, may result in fragmented flow tables, and could increase latency and overhead.

When recursive network virtualization (previously described herein) is deployed, each service network provider can have different roles; a network service provider may serve as a client and as a service provider at the same time. As a client, it receives an SFL from the service provider one level below it in the SDN architecture (e.g., as a client at the second level 130, it receives an SFL from a service provider at the first level 120 of FIG. 1). As a service provider, it administers the SFLs that identify the virtual networks it sells or leases. A packet-handling device can use the SFLs in the label stack to identify which virtual networks the data packets belong to and then route or process the packets accordingly.

Figure 6:
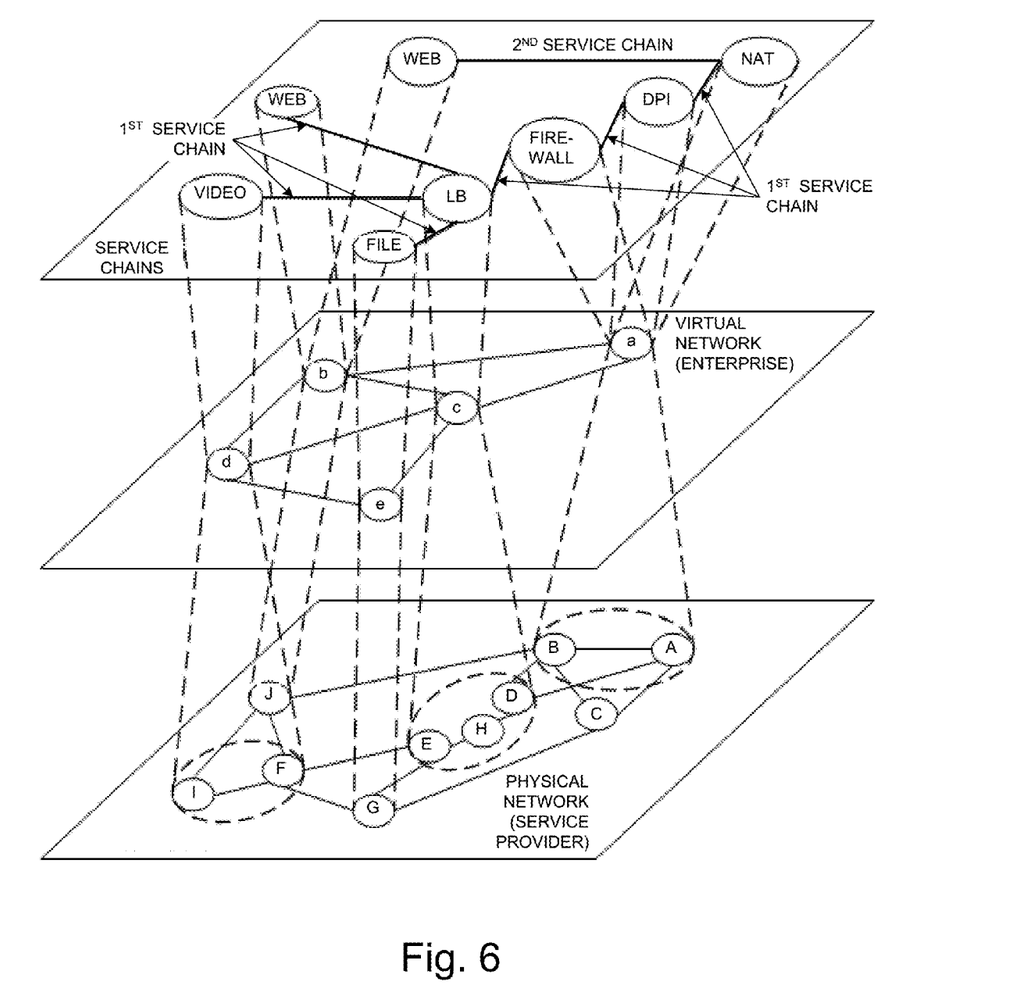
FIG. 6 illustrates an example of service chaining in an embodiment according to the present invention.

FIG. 6 illustrates an example of service chaining in an embodiment according to the present invention. In the example of FIG. 6, an enterprise leases a virtual network from a network provider and provides two types of service chains. The first service chain, designed for the enterprise's employees, routes traffic through NAT, DPI (deep packet inspection), a firewall, a load balancer (LB), and various servers. The second service chain, designed for guest visitors, routes traffic only through NAT and Web servers. Each service chain is assigned a different SFL by the enterprise, while the virtual network of the enterprise is assigned an SFL by the network provider. Traffic flows for the different service chain instances can be uniquely identified and routed through the use of the two different SFLs. Accordingly, physical resources that implement the various functions mentioned above can be shared by the two service chains. This enables greater flexibility and can lead to significant cost reductions.

In a similar manner, SFLs can be used to help implement various types of services. For example, an enterprise can assign one SFL to data packets that are associated with one quality-of-service (QoS) requirement, and another SFL to data packets that are associated with a different QoS requirement. Packet-handling devices can then process the data packets according to their respective QoS requirements as differentiated by the SFL in their headers.

In summary, in embodiments according to the present disclosure, an SFL is used as an identifier for a service instance such as, but not limited to, network virtualization, service chaining, and application-specific steering. The SFL is controlled by service providers and used by clients and packet-handling devices to route traffic by service instance. The format of an SFL is simple enough that it can be used without negatively impacting overhead and may reduce overhead relative to other solutions. By stacking SFLs, recursive services such as recursive network virtualization can be supported while allowing different entities to exercise control over their own resources. Furthermore, SFLs can be implemented with existing protocols and technologies. At Layer 5, an SFL can traverse middle-boxes and legacy networks without being changed, so that the relationship between clients and service providers can be maintained end-to-end. Also, SFLs can effectively enable various new services. For instance, services such as service chaining and application-centric traffic steering can be realized with reduced overhead.

Figure 7:
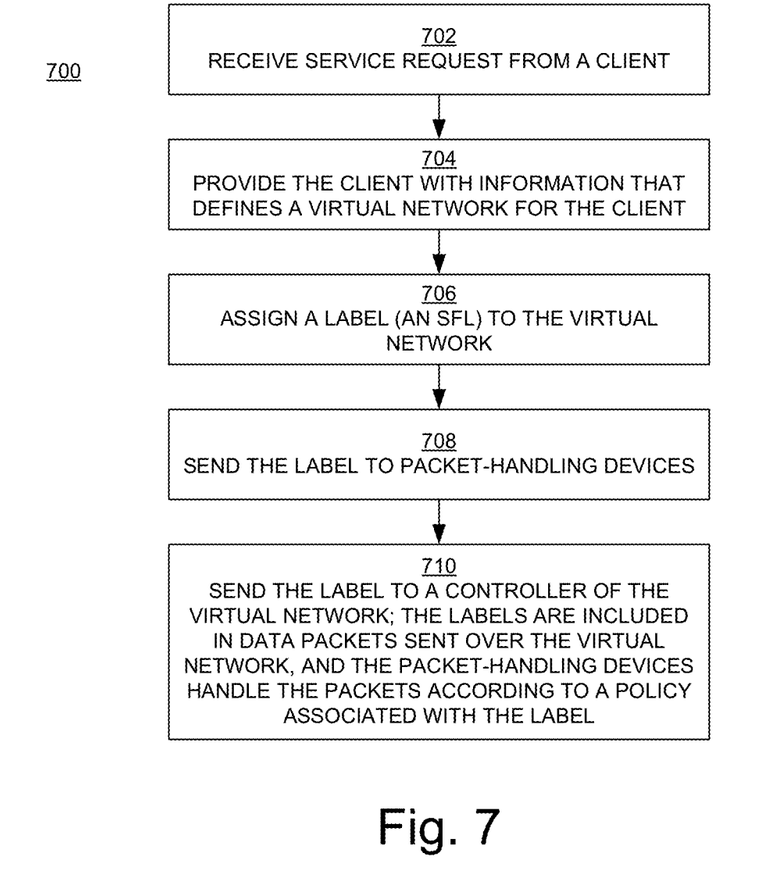
FIG. 7 is a flowchart illustrating an example of a computer-implemented method of data packet labeling and its use in an embodiment according to the present invention.

FIG. 7 is a flowchart 700 illustrating an example of a computer-implemented method of data packet labeling and its use in an embodiment according to the present invention. All or some of the operations represented by the blocks in the flowchart 700 can be implemented as computer-executable instructions residing on some form of non-transitory computer-readable storage medium. In an embodiment, at least some of the operations are performed by a service provider; more specifically, the operations are performed by a controller for the service provider. The service provider may be the provider of a physical network that is selling/leasing a virtual network, or the service provider may be an enterprise that has a virtual network on the physical network at one level of the SDN architecture 100 of FIG. 1 (e.g., at the first level 120) and is selling/leasing a virtual network at the next level of the SDN architecture (at the second level 130).

In block 702, a request is received from a client. The request can include information such as an ID for the client and other parameters that are used to define a virtual network. The client may be another service provider that may in turn sell or lease a virtual network to yet another client/provider.

In block 704, the client is provided with information that defines a virtual network for the client, where the virtual network is implemented at one of the levels of a virtual network architecture (e.g., an SDN) that is implemented on a physical network.

In block 706, a label (e.g., an SFL) is assigned to the virtual network. In an embodiment, the label is unique to the virtual network relative to other labels assigned by the provider of the virtual network to other virtual networks that are at the same level of the virtual network architecture. In an embodiment, the SFL has a lifetime but can be renewed when the lifetime expires. If it is not renewed, then the SFL expires but can recycled (e.g., reassigned to the virtual network or assigned to another virtual network).

In block 708, the label is sent to packet-handling devices in the part of the physical network that is used by the virtual network. The packet-handling devices can store the label. In an embodiment, a routing or steering policy is associated with the label; the policy indicates how data packets that include the label are to be handled by the packet-handling devices. In an embodiment, the label is stored in a routing table that can be accessed by the packet-handling devices; in such an embodiment, the policy is indexed by the label.

In block 710, the label is also sent to a controller of the virtual network. The label is then included in data packets sent over the virtual network. In an embodiment, the label is inserted at Layer 5 of the headers of the data packets. The packet-handling devices handle (e.g., route or process) the data packets on the virtual network according to a policy associated with the label. The processing can include, for example, NAT, DPI, and load balancing.

The packet headers may include a stack of labels (e.g., a second label in addition to the first label just described), in which case the data packets are handled according to a policy that is determined using the combination of labels in the stack. The first label may be associated with a virtual network at one level of a virtual network architecture, and the second label may be associated with a virtual network at another level of the virtual network architecture, in order to implement recursive network virtualization services as previously described herein. Alternatively, both labels may be associated with the same virtual network (at the same level of a virtual network architecture), but the first label is associated with a first service chain and the second label is associated with a second service chain.

Figure 8:
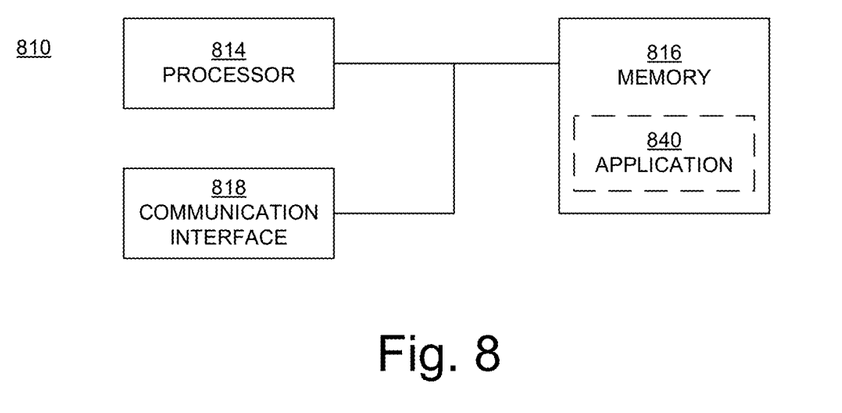
FIG. 8 is a block diagram of an example of a controller capable of implementing embodiments according to the present invention.

FIG. 8 is a block diagram of an example of a controller 810 capable of implementing embodiments according to the present invention. The controller 810 can be implemented in software. The controller 810 can be implemented by or using any single or multi-processor computing device or system capable of executing computer-readable instructions, such as the instructions described in conjunction with FIG. 7. In its most basic configuration, the controller 810 may be implemented by a device that includes at least one processing circuit (e.g., the processor 814) and at least one non-volatile storage medium (e.g., the memory 816).

The processor 814 generally represents any type or form of processing unit or circuit capable of processing data or interpreting and executing instructions. In certain embodiments, the processor 814 may receive instructions from a software application or module. These instructions may cause the processor 814 to perform the functions of one or more of the example embodiments described and/or illustrated herein.

The system memory 816 generally represents any type or form of volatile or non-volatile storage device or medium capable of storing data and/or other computer-readable instructions. Examples of system memory 816 include, without limitation, RAM, ROM, flash memory, or any other suitable memory device. Although not required, in certain embodiments the node 810 may include a volatile memory unit in addition to a non-volatile storage unit.

The controller 810 may be implemented by a device that also includes one or more components or elements in addition to the processor 814 and the system memory 816. For example, the controller 810 may be implemented by a device that includes a memory controller, an input/output (I/O) controller, and a communication interface 818, each of which may be interconnected via a communication infrastructure.

The communication interface broadly represents any type or form of communication device or adapter capable of facilitating communication between the controller 810 and one or more other devices such as end-user devices and packet-handling devices.

The controller 810 can execute an application 840 that allows it to perform operations (e.g., the operations of FIG. 7). A computer program containing the application 840 may be loaded into the controller 810. For example, all or a portion of the computer program stored on a computer-readable medium may be stored in the memory 816. When executed by the processor 814, the computer program can cause the processor to perform and/or be a means for performing the functions of the example embodiments described and/or illustrated herein. Additionally or alternatively, the example embodiments described and/or illustrated herein may be implemented in firmware and/or hardware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to enable others skilled in the art to best utilize the invention and its embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A controller for a first virtual network that is at a first level of a virtual network architecture implemented on a physical network, the controller implemented by a device comprising:
    memory that stores instructions; and
    a processing circuit coupled to the memory, wherein the instructions, when executed, cause the processing circuit to perform a method comprising:
        receiving, from a controller for a service provider for the first virtual network, a first label identifying the first virtual network;
        associating a first policy with the first label, the first policy indicating how data packets that include the first label are to be handled by packet-handling devices in the physical network that are included in the first virtual network;
        sending the first policy to the packet-handling devices via the controller for the service provider; and
        including the first label in a first plurality of data packets that are sent over the first virtual network to distinguish the first virtual network from other virtual networks at the first level on the same physical network and that is unique within a space administered by the controller to other virtual networks administered by other controllers at different levels.

2. The controller of claim 1, wherein the first label is unique to the first virtual network relative to other labels that are assigned by the controller for the service provider to the other virtual networks at the first level of the virtual network architecture.

3. The controller of claim 1, wherein the first label is included in the headers of the first plurality of data packets at Layer 5 of the International Organization for Standardization Open Systems Interconnection (ISO/OSI) model.

4. The controller of claim 1, wherein the first label has a lifetime, wherein the first label is renewable when the lifetime expires and is terminated if not renewed.

5. The controller of claim 1, wherein the first policy comprises a destination for the first plurality of data packets.

6. The controller of claim 1, wherein the first policy comprises a type of processing to be performed on the first plurality of data packets, the type of processing selected from the group consisting of: network address translation; deep packet inspection; and load balancing.

7. The controller of claim 1, wherein the first label corresponds to a quality-of-service requirement for the first plurality of data packets.

8. The controller of claim 1, wherein the first plurality of data packets include a second label associated with a second virtual network that is implemented on the physical network at a second level of the virtual network architecture, wherein the first label is included in the first plurality of data packets in addition to the second label.

9. The controller of claim 1, wherein the method further comprises:
    generating a second label for a second virtual network that is implemented at a second level of the virtual network architecture, the second label unique to the second virtual network relative to other labels that are assigned by the controller for the first virtual network to other virtual networks at the second level of the virtual network architecture; and
    sending the second label to a controller for the second virtual network.

10. The controller of claim 1, wherein the method further comprises:
    receiving, from the controller for the service provider, a second label that is unique to the first virtual network relative to other labels that are assigned by the controller for the service provider to the other virtual networks at the first level of the virtual network architecture;
    associating a second policy with the second label, the second policy different from the first policy and indicating how data packets that include the second label are to be handled by the packet-handling devices that are included in the first virtual network;
    sending the second policy to the packet-handling devices via the controller for the server provider; and
    including the second label in a second plurality of data packets that are sent over the first virtual network.

11. The method of claim 10, wherein a combination of the first and second labels in a stack of labels uniquely identifies which of the first and other virtual networks at the first level the data packets belong to at any layer in the virtual network architecture.

12. A controller implemented by a device comprising:
    a non-transitory memory storage comprising instructions; and
    one or more processors in communication with the memory storage, wherein the one or more processors execute the instructions to:
        generate a label for a virtual network, the virtual network at a level of a virtual network architecture that is implemented on a physical network, the label unique to the virtual network relative to labels that are assigned by the controller to other virtual networks implemented on the physical network at the same said level of the virtual network architecture;
        provide the label to a controller for the virtual network such that the label is included in data packets that belong to the virtual network; and
        send the label to a packet-handling device that is in the physical network and part of the virtual network and handles the data packet according to a policy when the label is matched to a corresponding entry stored in a flow table of the packet-handling device and the label indicates that no other label exists in a header of the data packet.

13. The controller of claim 12, wherein the label has a lifetime, wherein the label is renewable when the lifetime expires and is terminated if not renewed.

14. A method performed by a packet-handling device in a physical network, the method comprising:
    receiving, from a controller, a first label for a first virtual network that is implemented on the physical network at a first level of a virtual network architecture, the first label unique to the first virtual network relative to other labels assigned by a service provider to other virtual networks at the first level of the virtual network architecture and providing identification of one or more service instances;

receiving a first policy associated with the first label, the first policy indicating how data packets that include the first label are to be processed;

receiving a first plurality of data packets that include the first label in a header of the data packet at Layer 5 of the International Organization for Standardization Open Systems Interconnection (ISO/OSI) model; and processing the first plurality of data packets according to the first policy.

15. The method of claim 14, wherein the first label has a lifetime and expires if not renewed.

16. The method of claim 14, further comprising storing the first label and the first policy in a routing table accessible by the packet-handling device, wherein the first policy is indexed by the first label.

17. The method of claim 14, further comprising:

receiving a second label for a second virtual network that is implemented on the physical network at a second level of the virtual network architecture, the second virtual network comprising a portion of the first virtual network;

receiving a second plurality of data packets that include the first label and the second label; and processing the second plurality of data packets according to a second policy that is identified using the combination of the first and second labels.

18. The method of claim 17, wherein the first policy comprises a destination for the first plurality of packets and wherein the second policy comprises a destination for the second plurality of packets.

19. The method of claim 17, wherein the first policy comprises a first type of processing to be performed on the first plurality of data packets and wherein the second policy comprises a second type of processing to be performed on the second plurality of data packets, the first and second types of processing each selected from the group consisting of: network address translation; deep packet inspection; and load balancing.

20. The method of claim 17, wherein the first policy comprises a first quality-of-service requirement for the first plurality of data packets and wherein the second policy comprises a second quality-of-service requirement for the second plurality of data packets.

* * * * *